United States Patent [19]

Watanabe

[11] Patent Number: 5,586,481
[45] Date of Patent: Dec. 24, 1996

[54] APPARATUS FOR PREVENTING DISENGAGEMENT OF SEAL MEMBER IN A BOOSTER

[75] Inventor: Makoto Watanabe, Saitama-ken, Japan

[73] Assignee: Jidosha Kiki Co., Ltd., Tokyo, Japan

[21] Appl. No.: 359,575

[22] Filed: Dec. 20, 1994

[30] Foreign Application Priority Data

Jan. 28, 1994 [JP] Japan .................................. 6-026085

[51] Int. Cl.$^6$ ..................................................... F15B 9/10
[52] U.S. Cl. ........................................................ 91/376 R
[58] Field of Search ............................... 91/369.2, 376 R; 92/96

[56] References Cited

U.S. PATENT DOCUMENTS

| | | |
|---|---|---|
| 3,845,692 | 11/1979 | Takeuchi . |
| 4,522,108 | 6/1985 | Takeuchi et al. ............... 91/376 R |
| 4,793,242 | 12/1988 | Kobayashi . |
| 4,846,047 | 7/1989 | Uyama et al. . |
| 5,146,837 | 9/1991 | Inoue . |
| 5,337,650 | 8/1994 | Uyama ............................. 91/376 R |

FOREIGN PATENT DOCUMENTS

| | | |
|---|---|---|
| 0220987 | 5/1987 | European Pat. Off. ............. 91/376 R |
| 0097550 | 6/1983 | Japan .................................. 91/376 R |
| 1177686 | 1/1970 | United Kingdom . |

Primary Examiner—Hoang Nguyen
Attorney, Agent, or Firm—Flynn, Thiel, Boutell & Tanis, P.C.

[57] ABSTRACT

A booster as may be used in a brake of an automobile is provided. Specifically, an improvement of means for sealing between a stepped tubular portion formed on the rear side of a shell and a tubular terminal end of a valve body which extends therethrough is provided. According to the invention, an annular seal member and a bearing are sequentially fitted inside the stepped tubular portion of the shell from the front side and their inner peripheral portions are disposed in sliding contact with the tubular terminal end of the valve body. A plurality of projections are formed on either end face of the seal member or the bearing which opposes each other around its outer periphery. The provision of such projections is effective to prevent the seal member from being disengaged from the step of the stepped tubular portion in the rearward direction.

9 Claims, 3 Drawing Sheets

APPARATUS FOR PREVENTING DISENGAGEMENT OF SEAL MEMBER IN A BOOSTER

FIELD OF THE INVENTION

The invention relates to a booster as used in a brake of an automobile, and more particularly, an apparatus for preventing disengagement of a seal member interposed between a tubular terminal end of a valve body and a stepped tubular portion of a shell.

DESCRIPTION OF THE PRIOR ART

As is known in the art, a booster comprises a shell including a stepped tubular portion extending axially rearward from a rear end of the shell and having a step formed therein, the tubular portion having a greater diameter forwardly of the step, a valve body disposed within the shell in a reciprocable manner and including a tubular terminal end which projects axially rearwardly through the stepped tubular portion of the shell, a bearing disposed within a portion of the shell having a greater diameter for slidably supporting the tubular terminal end of the valve body, and an annular seal member disposed within the portion of the shell having a greater diameter and is held sandwiched between the step and the bearing for sealing between the stepped tubular portion and the tubular terminal end of the valve body.

The seal member includes an annular portion of an increased wall thickness which is fitted inside the shell portion having a greater diameter, and an annular lip portion extending rearward and radially inward in an oblique manner from the front side of the annular portion, and is generally V-shaped in cross section. The front end face of the seal member, or the end face which faces the bearing, is formed in a plane which is substantially orthogonal to the axial direction.

During the assembly of the seal member, the seal member is initially fitted inside a portion of the stepped tubular portion which has a greater diameter, followed by fitting the bearing into the same portion, whereupon the bearing is pushed through a given stroke into the tubular portion having a greater diameter so that the seal member is held sandwiched between the bearing and the step of the stepped tubular portion. Under this condition, the outer annular portion having an increased wall thickness is held sandwiched between the step and the bearing to provide a seal between the outer peripheral surface of the annular portion and the inner peripheral surface of the stepped tubular portion. The lip portion is disposed in sliding contact with the outer peripheral surface of the tubular terminal end of the valve body to seal it.

It will be seen that during the assembly of the seal member mentioned above, the end face of the seal member which faces the bearing is urged into contact with the bearing and that due to manufacturing tolerances, the front end face of the seal member may be driven into contact with the bearing around its inner periphery. In this event, the inner periphery of the seal member which contacts the bearing, and which is located radially inward of the end face of the annular portion of the seal member which contacts the step of the stepped tubular portion by an amount corresponding to the thickness of the lip portion, may be forcibly pushed inside the annular seal member, in a manner as if folded back upon itself, accompanying deformation while being rotated around the step of the stepped tubular portion as the seal member is pushed inward, thereby causing a disengagement of the seal member from the step or producing a likelihood that the sealing capability may be degraded.

SUMMARY OF THE INVENTION

In view of the foregoing, the present invention provides an apparatus for preventing disengagement of a seal member in a booster which positively prevents an inner periphery of the seal member from becoming contacting the bearing during the assembly of the seal member, thereby avoiding any reduction in the sealing capability and the likelihood of the seal member being disengaged rearwardly from the step.

Specifically, the invention provides an improvement in a booster which is constructed in a known manner as mentioned above, the improvement comprising the provision of a projection provided on one of an outer periphery of the end face of the seal member which faces the bearing or an outer periphery of the end face of the bearing which faces the seal member and projecting toward the other.

With this arrangement, the seal member and the bearing will contact with each other through the projection provided on the outer periphery of either member during the assembly of the seal member, whereby the seal member will be held sandwiched between the projection on the outer periphery and the step of the stepped tubular portion which is disposed in surrounding relationship therewith. Consequently, the inner periphery of the seal member is no longer subject to any action which would forcibly drive such portion inside the annular seal member while causing a deformation thereof. Accordingly, a disengagement of the seal member is prevented, assuring a reliable sealing function.

Above and other objects, features and advantages of the invention will become apparent from the following description of several embodiments thereof with reference to the attached drawings.

DETAILED DESCRIPTION OF EMBODIMENTS

Figure 1:
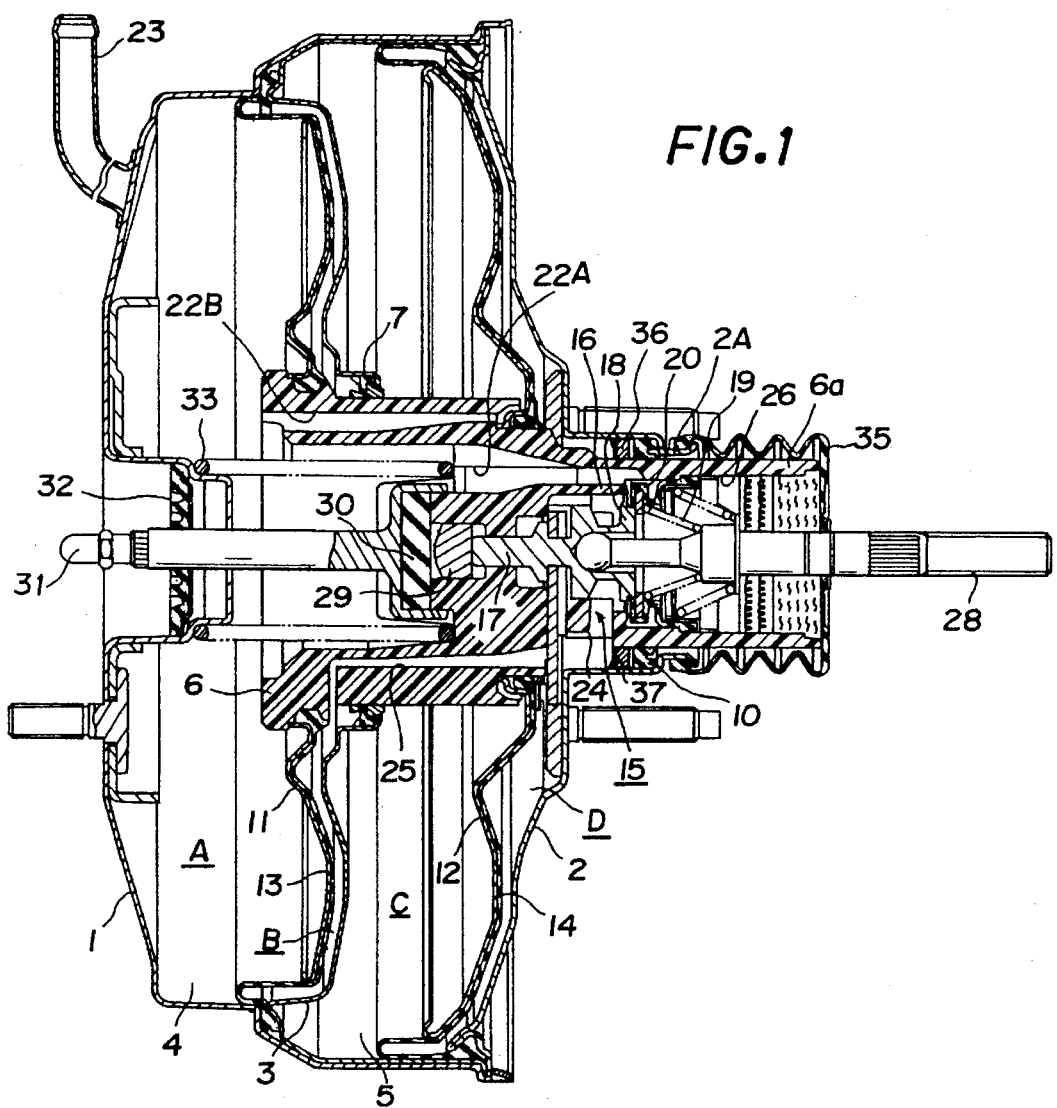
FIG. 1 is a longitudinal section of one embodiment of the invention.

Referring to FIG. 1, a front and a rear shell 1, 2 define together an enclosed vessel, and a center plate 3 which is centrally disposed therein divides the interior of the vessel into a pair of front chamber 4 and rear chamber 5. A substantially tubular valve body 6 slidably extends through an axial portion of the center plate 3 and is hermetically sealed thereagainst by an annular seal member 7. A tubular terminal end 6a of the valve body 6 projects axially rearward of a stepped tubular portion 2A which in turn extends radially rearward from a rear end face of the rear shell 2. A seal member 10 is provided between the tubular terminal end 6a and the stepped tubular portion 2A to provide a seal therebetween.

A front power piston 11 and a rear power piston 12, which are disposed within the front and the rear chamber 4, 5, respectively, are connected to the valve body 6, and a front and a rear diaphragm 13, 14 are applied to the back surfaces of the power pistons 11, 12, respectively, thus defining a constant pressure chamber A and a variable pressure chamber B across the front diaphragm 13 and defining a constant pressure chamber C and a variable pressure chamber D across the rear diaphragm 14.

The valve body 6 contains a valve mechanism 15, which comprises an annular, first valve seat 16 formed on the valve body 6, an annular, second valve seat 18 formed on the right end of a valve plunger 17, which is reciprocably mounted on the valve body 6 at a location radially inward of the first valve seat 16, and a valve element 20 which is urged by a spring 19 from right to left, as viewed in FIG. 1, so as to be seated upon either valve seat 16 or 18.

A space which is located radially outward of an annular seat defined by a contact between the first valve seat 16 and the valve element 20 communicates with the constant pressure chamber A through an axial constant pressure passage 22A which is formed in the valve body 6, and the chamber A in turn communicates with an intake manifold of an engine, not shown, through a tubing 23 which serves introducing a negative pressure. The constant pressure chamber A is maintained in communication with the constant pressure chamber C through another axial constant pressure passage 22B, also formed in the valve body 6.

On the other hand, a space located radially inward of the annular seat defined by the contact between the first valve seat 16 and the valve element 20, but radially outward of an annular seat defined by the contact between the second valve seat 18 and the valve element 20, or located intermediate the inner and the outer annular seats, communicates with the variable pressure chamber D through a radial variable pressure passage 24 formed in the valve body 6, and the chamber D in turn communicates with the variable pressure chamber B through another variable pressure passage 25 also formed in the valve body 6.

Finally, a space located radially inward of the inner annular seat defined by the contact between the second valve seat 18 and the valve element 20 communicates with a pressure passage 26 which in turn communicates with the atmosphere.

The valve plunger 17, which is slidably disposed within the valve body 6, has its right end connected to an input shaft 28 which is mechanically coupled to a brake pedal, not shown, and a plunger plate 29 and a reaction disc 30 are sequentially disposed to the left of the valve plunger 17. The reaction disc 30 is received in a recess which is formed in the right end of a push rod 31, the left end of which slidably extends through a seal member 32 to project through the axial portion of the front shell 1 for connection with the piston of a master cylinder, not shown.. The valve body 6 is normally maintained in its inoperative position shown by a return spring 33.

Figure 2:
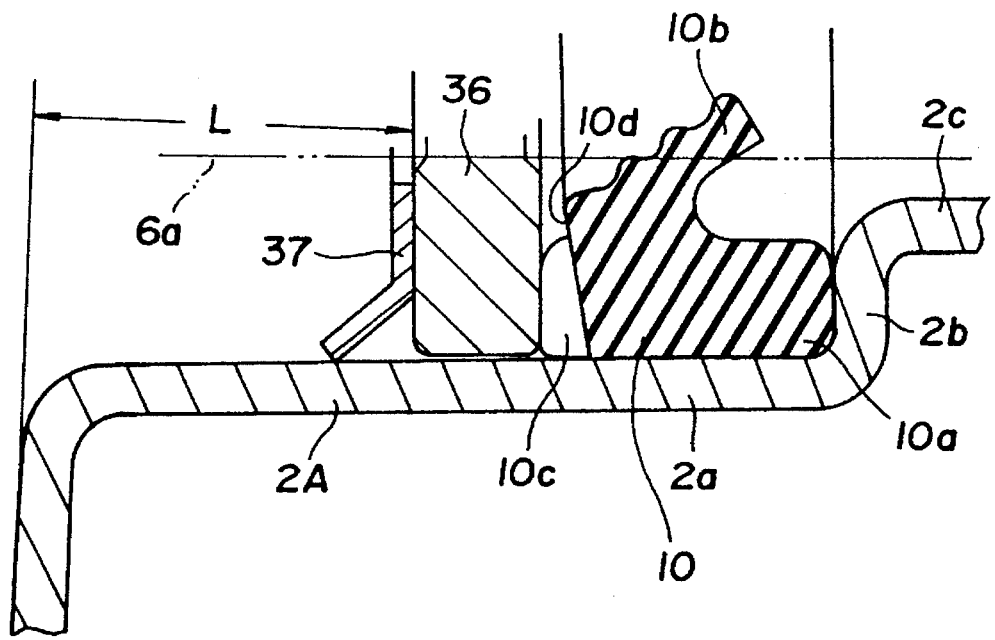
FIG. 2 is a cross section, to an enlarged scale, of a seal member 10 which is assembled.

As shown to an enlarged scale in FIG. 2, the stepped tubular portion 2A which is formed to extend from the rear axial portion of the rear shell 2 includes a portion of a greater diameter 2a which is located foremost, a step 2b which is bent radially inward from the rear end of the portion 2a, and a portion 2c of a reduced diameter which extends rearwardly from the step 2b. A dust cover 35 (see FIG. 1) has its left end mounted around the periphery of the portion 2c.

The seal member 10 which provides a seal between the tubular terminal end 6a of the valve body 6 and the stepped tubular portion 2A comprises an annular portion 10a of an increased thickness which is fitted inside the portion 2a of a greater diameter, and an annular lip portion 10b which extends from the front side of the annular portion 10a rearwardly and radially inward in an oblique manner so as to present a cross section which is substantially V-shaped. In the embodiment shown, the front end face of the seal member is bevelled so as to present a plane which is at an angle with respect to the axial direction so that the inner periphery thereof projects forwardly of the outer periphery. In addition, a plurality of projections 10c (see FIG. 3) are formed on the front end face of the seal member around its outer periphery at an equal spacing as viewed in the circumferential direction, and project forwardly.

A bearing 36 is disposed forwardly of the seal member 10 around the portion 2a having a greater diameter of the stepped tubular portion 2A so as to support the tubular terminal end 6a of the valve body 6 in a reciprocable manner. The bearing 36 is normally urged to a position which is located a given distance L from the inner wall surface of the rear shell 2 as a reference, and is held in place by a retainer 37.

Figure 3:
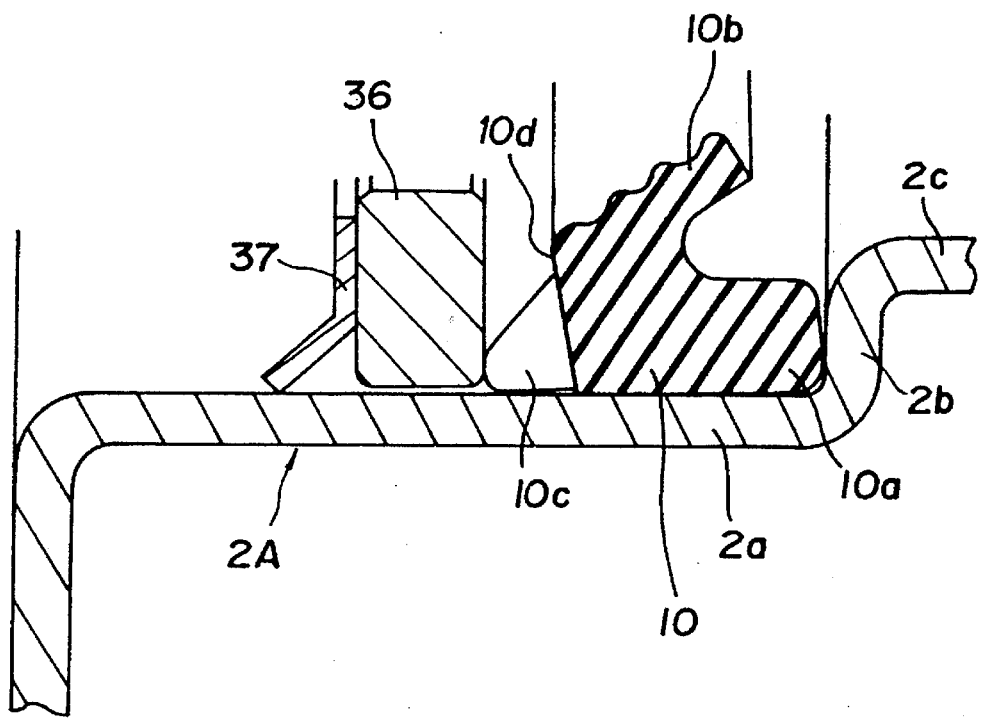
FIG. 3 is an enlarged cross section illustrating an operation which assembles the seal member 10.

During the assembly of the seal member 10 in the described arrangement, the seal member 10 is initially fitted around the portion 2a having a greater diameter of the stepped tubular portion 2A, as shown in FIG. 3, and the bearing 36 and the retainer 37 are sequentially fitted inside the portion 2a. By employing a jig, not shown, the bearing 36 and the seal member 10 are urged toward the step 2b through the retainer 37 until the bearing 36 is displaced to the given distance L as referenced to the inner wall surface of the rear shell 2, whereupon the bearing 36 is maintained in place.

During such process, the projections 10c which are formed on the seal member 10 around its outer periphery abut against the bearing 36, whereby the seal member 10 is held sandwiched between such projections 10c and the step 2b of the stepped tubular portion 2A, thus preventing the inner peripheral portion of the seal member from being driven radially inward while it is being deformed.

To consider this, assume that the projections 10c are not provided. In this instance, an inner peripheral portion 10d of the seal member 10 will abut against the bearing 36. Since the inner peripheral portion 10d which abuts against the bearing 36 is located radially inward of the right end face of the annular portion 10a which is disposed in contact with the step 2b of the stepped tubular portion 2A, by an amount corresponding to the thickness of the lip portion 10b, there is a likelihood that as the seal member 10 is urged, the inner peripheral portion 10d thereof will be rotated about the step 2b to be deformed inside the annular seal member 10, thereby causing the seal member 10 to be disengaged from the step 2b in the rear direction or degrading the sealing capability if such disengagement does not occur.

However, according to the present embodiment, such disengagement can be prevented, and the seal member 10 may be reliably positioned in place where the annular portion 10a of the seal member 10 is held sandwiched between the step 2b of the stepped tubular portion 2A and the bearing 36 to provide a seal between the outer peripheral surface of the annular portion 10a and the inner peripheral surface of the stepped tubular portion 2A. When the valve body 6 is assembled therein subsequently, the annular lip portion 10b of the seal member 10 will be in sliding contact with the outer peripheral surface of the tubular terminal end 6a of the valve body 6, thus providing a sealing action.

Figure 4:
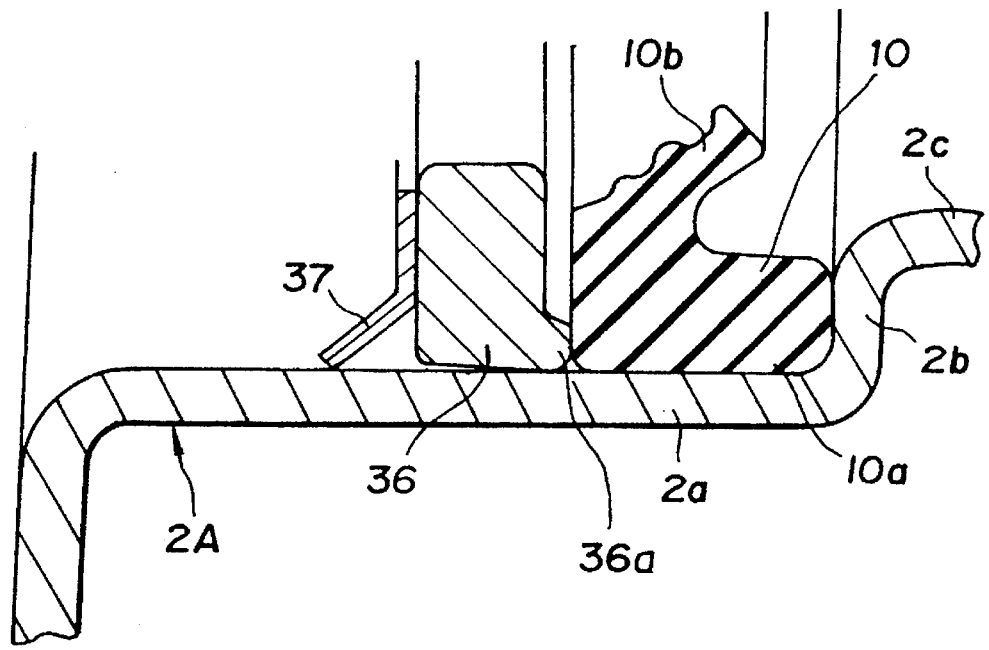
FIG. 4 is a cross section of part of another embodiment of the invention.

FIG. 4 shows another embodiment of the invention in which a plurality of projections 36a are formed on the bearing 36 around its outer periphery at an equal circumferential spacing so as to project toward the seal member 10, and act in the similar manner as the projections 10c formed on the seal member 10 in the previous embodiment. In other respects, the arrangement is similar to the previous embodiment, and corresponding parts are designated by like numerals and characters. It will be evident that this embodiment achieves the similar functioning and effect as achieved by the first embodiment.

Figure 5:
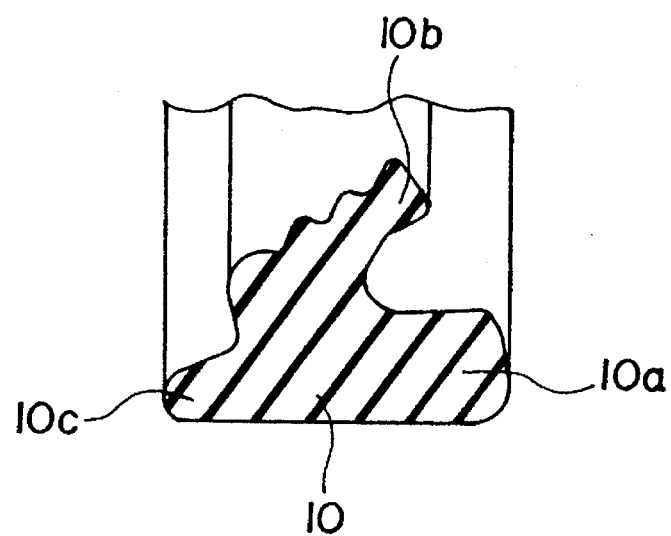
FIG. 5 is a cross section of a further embodiment of the invention.

In the described embodiments, the projections 10c on the seal member 10 or the projections 36a on the bearing 36 are plural in number and are circumferentially spaced apart, and accordingly balancing the loading against the hermetic sealability is facilitated by choosing a suitable size or suitable number for such projections. However, it should be understood that rather than providing a plurality of projections 10c or 36a, a single projection which is continuous in the circumferential direction may be used, and this again is effective to prevent the disengagement of the seal member 10 (see FIG. 5). (An annular projection 36a which is circumferentially continuous is not specifically shown since the illustration is similar to FIG. 4).

While the invention has been disclosed above in connection with the several embodiments thereof, it should be understood that a number of changes, modifications and substitutions therein are possible from the above disclosure without departing from the spirit and scope of the invention defined by the appended claims.

What is claimed is:

1. A booster comprising:

a shell including a stepped tubular portion which extends axially rearward from a rear end face of the shell and has a step formed therein, the stepped tubular portion having a greater diameter forwardly of the step, a reciprocable valve body disposed within the shell and including a tubular terminal end which projects axially rearward through the stepped tubular portion, a bearing disposed within the portion of the stepped tubular portion which has the greater diameter for slidably supporting the tubular terminal end of the valve body, an annular seal member disposed within the portion of the stepped tubular portion having the greater diameter so as to be held sandwiched between the step and the bearing in sealing engagement with the tubular terminal end to provide a seal between the stepped tubular portion and the tubular terminal end of the valve body, the seal member having an end face, and the bearing having an end face facing toward the end face of the seal member in a mutually opposing relation, each of the mutually opposing end faces being defined by a radially outer region and a radially inner region; and means for preventing disengagement of the seal member comprising a projection portion disposed on one of the mutually opposing end faces of the seal member and the bearing in the radially outer region of said one of the mutually opposing end faces for engagement with the other of the mutually opposing end faces, the radially inner regions of the mutually opposing end faces being circumferentially continuously spaced apart and out of contact with one another by a circumferentially continuous space radially extending inwardly from the radially inner side of said projection portion to the radially inner edge of at least one of said opposing end faces.

2. An apparatus according to claim 1 in which the bearing is fitted inside the portion of the stepped tubular portion having the greater diameter from the front side thereof and is positioned at a given axial position therein by a retainer which is disposed in abutment against the bearing, and in which the seal member comprises an annular portion having an increased wall thickness which is fitted within the portion of the stepped tubular portion having the greater diameter and is disposed in contact with the step, and a lip portion located radially inward of the annular portion and disposed for sliding contact with an outer peripheral surface of the tubular terminal end of the valve body.

3. An apparatus according to claim 2 in which the end face of the seal member which faces the bearing is tapered so that the radially inner region thereof projects forwardly of the radially outer region, the projection portion including a plurality of projections formed on the end face of the seal member which faces the bearing at a plurality of locations which are circumferentially spaced apart around the outer periphery thereof in the radially outer region.

4. A apparatus according to claim 2 in which the end face of the seal member which faces the bearing is tapered so that the radially inner region thereof projects forwardly of the radially outer region, and in which the projection portion comprises an annular projection formed on the end face of the seal member which faces the bearing around the radially outer region, said annular projection being circumferentially continuous.

5. An apparatus according to claim 2 in which the projection portion includes a plurality of projections formed on the end face of the bearing which faces the seal member around the radially outer region thereof at a plurality of locations which are circumferentially spaced apart.

6. An apparatus according to claim 2 in which the projection portion comprises an annular projection which is formed on the end face of the bearing which faces the seal member around the radially outer region thereof, the annular projection being circumferentially continuous.

7. A booster comprising:

a shell including a stepped tubular portion which extends axially rearward from a rear end face of the shell and has a radially inward extending step, the stepped tubular portion having a portion with a greater diameter disposed forwardly of the step;

a reciprocable valve body disposed within the shell and including a tubular terminal end which projects axially rearward through the stepped tubular portion;

a bearing disposed forwardly of the step within the greater diameter portion and extending about an outer periphery of the tubular terminal end for slidably supporting the tubular terminal end of the valve body, the bearing having a greater diameter corresponding to the greater diameter of the stepped tubular portion;

an annular seal member disposed within the greater diameter portion of the stepped tubular portion, the seal member having a radially outer portion in contact with and sandwiched between the step and the bearing, and a radially inner portion extending radially inwardly from the radially outer portion in sealing engagement with the tubular terminal end to provide a seal between the stepped tubular portion and the tubular terminal end of the valve body, the seal member having an end face and the bearing having an end face facing toward the end face of the seal member in a mutually opposing relation, each of the mutually opposing end faces being defined by a radially outer face region and a radially inner face region; and means for preventing disengagement of the seal member comprising a projection portion which is disposed on one of the mutually opposing end faces of the seal member and the bearing and extends from the radially outer face region of said one of the mutually opposing end faces so as to contact the radially outer face region of the other of the mutually opposing end faces, the radially inner regions of the mutually opposing end faces being circumferentially continuously spaced apart and out of contact with one another by a circumferentially continuous space radially extending inwardly from the radially inner side of said projection portion to the radially inner edge of at least one of said opposing end faces.

8. An apparatus according to claim 7 in which the projection portion includes a plurality of projections disposed on said one of the mutually opposing end faces at a plurality of locations which are circumferentially spaced apart around the radially outer region.

9. An apparatus according to claim 7 in which the projection portion comprises an annular projection disposed on said one of the mutually opposing end faces, the annular projection being circumferentially continuous.

* * * * *